US007797102B2

(12) United States Patent
Fortier

(10) Patent No.: US 7,797,102 B2
(45) Date of Patent: Sep. 14, 2010

(54) FLIGHT MANAGEMENT SYSTEM FOR AN AIRCRAFT

(75) Inventor: Stéphanie Fortier, Cugnaux (FR)

(73) Assignee: Thales (FR)

( * ) Notice: Subject to any disclaimer, the term of this patent is extended or adjusted under 35 U.S.C. 154(b) by 944 days.

(21) Appl. No.: 11/637,836

(22) Filed: Dec. 13, 2006

(65) Prior Publication Data

US 2007/0150178 A1 Jun. 28, 2007

(30) Foreign Application Priority Data

Dec. 13, 2005 (FR) .................................. 05 12603

(51) Int. Cl.
*G01C 21/00* (2006.01)

(52) U.S. Cl. ....................... 701/206; 701/123; 340/971; 340/973

(58) Field of Classification Search ................. 701/123, 701/204, 206–207, 3–4, 220; 340/995.28, 340/971, 963

See application file for complete search history.

(56) References Cited

U.S. PATENT DOCUMENTS 4,159,088 A * 6/1979 Cosley ....................... 244/182
4,312,041 A * 1/1982 DeJonge ..................... 701/123
4,325,123 A * 4/1982 Graham et al. .............. 701/110
4,760,530 A * 7/1988 Liden ......................... 701/123
4,827,417 A * 5/1989 Berger et al. .................... 701/5
5,023,797 A * 6/1991 Lappos et al. ............... 701/123
5,121,325 A * 6/1992 DeJonge ..................... 701/123
5,408,413 A * 4/1995 Gonser et al. ............... 701/204
5,459,666 A * 10/1995 Casper et al. ............... 701/123
5,526,265 A * 6/1996 Nakhla ........................ 701/16
5,574,647 A * 11/1996 Liden ........................... 701/8
6,507,782 B1 * 1/2003 Rumbo et al. ............... 701/121
7,437,225 B1 * 10/2008 Rathinam .................... 701/14
7,606,641 B2 * 10/2009 Allen ............................ 701/3

(Continued)

FOREIGN PATENT DOCUMENTS

AU 2002248131 A8 * 9/2001

(Continued)

OTHER PUBLICATIONS

Erzberger & Lee, "Constrained Optimum Trajectories With Specified Range," Journal of Guidance and Control, vol. 3, No. 1, pp. 78-85, Jan.-Feb. 1980.*

(Continued)

*Primary Examiner*—Cuong H Nguyen
(74) *Attorney, Agent, or Firm*—Lowe Hauptman Ham & Berner, LLP

(57) ABSTRACT

A flight management system for an aircraft, for executing a flight plan comprising referenced waypoints comprising a start point, an end point and intermediate waypoints, the said aircraft having a specified fuel quantity at the start of the said flight plan, executes a function of monitoring the fuel consumption with respect to at least one threshold value. The function comprises an operation for estimating if the quantity of fuel remaining on board drops below a threshold at any point in the flight plan included between the start point and the end point, and inserts a corresponding pseudo-waypoint in the flight plan, corresponding to the point where the said threshold is passed. The inserted pseudo-point is displayed on screens for displaying the flight plan.

18 Claims, 2 Drawing Sheets

U.S. PATENT DOCUMENTS

| | | | | |
|---|---|---|---|---|
| 7,623,960 | B2 * | 11/2009 | Wise et al. | 701/204 |
| 7,647,163 | B2 * | 1/2010 | Allen | 701/123 |
| 2002/0072414 | A1 * | 6/2002 | Stylinski et al. | 463/42 |
| 2006/0287781 | A1 * | 12/2006 | Bui | 701/3 |
| 2007/0150178 | A1 * | 6/2007 | Fortier | 701/206 |
| 2008/0071434 | A1 * | 3/2008 | Fortier et al. | 701/15 |
| 2008/0228333 | A1 * | 9/2008 | De Menorval et al. | 701/14 |
| 2008/0300737 | A1 * | 12/2008 | Sacle et al. | 701/3 |
| 2008/0300738 | A1 * | 12/2008 | Coulmeau et al. | 701/3 |
| 2009/0248224 | A1 * | 10/2009 | Tschannen | 701/3 |

FOREIGN PATENT DOCUMENTS

| | | | | |
|---|---|---|---|---|
| EP | 1316192 | A2 | * | 4/2003 |
| EP | 1673591 | A1 | * | 6/2006 |
| FR | 2894705 | A1 | * | 6/2007 |
| FR | 2906048 | A1 | * | 3/2008 |
| JP | 2005532575 | W | * | 10/2005 |
| WO | WO 2005033631 | A1 | * | 4/2005 |
| WO | WO 2007005007 | A2 | * | 1/2007 |

OTHER PUBLICATIONS

DeJonge and Syblon, "Applicant of Cost Index to Fleet Hub Operation," Technical Information Service, American Institute of Aeronautics and Astronautics, No. WA7-10:45, pp. 179-184 (believed to be published in 1985).*

Burrows & Chakravarty, "Time-Controlled Aircraft Guidance in Uncertain Winds and Temperatures," Technical Information Service, American Institute of Aeronautics and Astronautics, No. WA7-11:45, pp. 191-197, (believed published in 1985).*

Liden, "Practical Considerations in Optimal Flight Management Computations," Technical Information Service, American Institute of Aeronautics and Astronautics, No. TA1-9:30, pp. 675-681, (believed published in 1986).*

Chakravarty, "Selection of an Optimal Cost Index for Airline Hub Operation," Journal of Guidance, vol. 8, No. 6, pp. 777-781, Nov.-Dec. 1985.*

The adverse impact of flight management systems on long range international airline operations; McIntyre, R.; Digital Avionics Systems Conference, 1996., 15th AIAA/IEEE; Digital Object Identifier: 10.1109/DASC.1996.559182; Publication Year: 1996 , pp. 359-363.*

Flight management of multiple aerial vehicles using genetic algorithms; Kanury, S. et al.; System Theory, 2006. SSST '06. Proceeding of the Thirty-Eighth Southeastern Symposium on; Digital Object Identifier: 10.1109/SSST.2006.1619100 Publication Year: 2006 , pp. 33-37.*

Real-time 4-D trajectory planning for RNP flight operations; Shih-Yih Young; Integrated Communications, Navigation and Surveillance Conference, 2009. ICNS '09.; Digital Object Identifier: 10.1109/ICNSURV.2009.5172862; Publication Year: 2009 , pp. 1-9.*

The 4D trajectory data link (4DTRAD) service—Closing the loop for air traffic control; Jackson, M.R.C. et al.; Integrated Communications, Navigation and Surveillance Conference, 2009. ICNS '09; Digital Object Identifier: 0.1109/ICNSURV.2009.5172860; Publication Year: 2009 , pp. 1-10.*

Fuel-optimal trajectories for aeroassisted coplanar orbital transfer problem; Naidu, D.S. et al.; Aerospace and Electronic Systems, IEEE Transactions on; vol. 26 , Issue: 2; Digital Object Identifier: 10.1109/7.53464; Publication Year: 1990 , pp. 374-381.*

Continuous descent approaches for maximum predictability; Ledesma, R.G. wt al..; Digital Avionics Systems Conference, 2007. DASC '07. IEEE/AIAA 26th; Digital Object Identifier: 10.1109/DASC.2007.4391871; Publication Year: 2007 , pp. 3.A.2-1-3.A.2-8.*

Descent profile options for continuous descent arrival procedures within 3d path concept; Kwok-On Tong et al..; Digital Avionics Systems Conference, 2007. DASC '07. IEEE/AIAA 26th; Digital Object Identifier: 10.1109/DASC.2007.4391872; Publication Year: 2007 , pp. 3.A.3-1-3.A.3-11.*

Flight management systems information exchange with AERA to support future air traffic control concepts; Mohleji, S.C.; Position Location and Navigation Symposium, 1992. Record. 500 Years After Columbus—Navigation Challenges of Tomorrow. IEEE PLANS '92., IEEE; Digital Object Identifier: 10.1109/PLANS.1992.185850; Pub. Yr: 1992 , pp. 240-247.*

Cooperative problem-solving activities in flight planning and constraints for commercial aircraft; Smith, P.J. et al.; Systems, Man and Cybernetics, 1995. Intelligent Systems for the 21st Century., IEEE International Conference on; vol. 5; Digital Object Identifier 10.1109/ICSMC.1995.538514, pp. 4563-4568.*

Fuel minimization in flight vehicle attitude control; Foy, W., Jr.; Automatic Control, IEEE Transactions on; vol. 8 , Issue: 2 Publication Year: 1963 , pp. 84-88.*

Hybrid fuel cell power in aircraft; Rajashekara, K. et al.; Industry Applications Magazine, IEEE vol. 14 , Issue: 4; Digital Object Identifier: 10.1109/MIAS.2008.923606; Publication Year: 2008 , pp. 54-60.*

Flight management system back-up navigation for the A330/A340 aircraft; Griguere, H.; Digital Avionics Systems Conference, 1991. Proceedings., IEEE/AIAA 10$^{th}$; Digital Object Identifier: 10.1109/DASC.1991.177213; Publication Year: 1991 , pp. 482-486.*

G1000-multifunction display pilot'squide for the Diamond DA40 Garmin, Jun. 28 2005 pp. 1-140.

Michael G. Gaffney: "Diamond G1000: Glass with Class. How the G1000 helps Pilots enhance situational awareness" Skyline Aeronautics, 2006 XP002396480.

"G1000-multifuntion display pilot'sguide for the Diamond DA40" GARMIN, Jun. 28, 2005, pp. 1-140, XP002396481.

Michael G. Gafney: "Diamond G1000: Glass with Class. How the G1000 helps Pilots enhance situational awareness" Skyline Aeronautics, [Online] 2006, XP002396480 Extrait de l'Internet: URL:http://www.skylineaero.com/diamondg1000article.html> [extrait le Aug. 28, 2006].

* cited by examiner

FLIGHT MANAGEMENT SYSTEM FOR AN AIRCRAFT

RELATED APPLICATION

The present application is based on, and claims priority from, France Application Number 0512603, filed Dec. 13, 2005, the disclosure of which is hereby incorporated by reference herein in its entirety.

FIELD OF THE INVENTION

The present invention relates to a flight management system for an aircraft. It relates more particularly to one of the functions of such a system, relating to the monitoring of fuel consumption during a flight, in order to ensure the mission of the aircraft in the required safety conditions.

For each mission, the pilot establishes a flight plan between the departure airport and the destination airport. In particular, for this purpose he defines the flight profile with waypoints, that is to say the positions over which he must pass, with the corresponding altitudes and speeds. In particular, he takes account of the declared meteorological conditions. Then the necessary fuel quantity on board the aircraft is determined on the basis of information provided by the established flight plan and of the predicted meteorological conditions over the corresponding journey. This quantity is determined in a strict and regulated manner and comprises: the quantity of fuel necessary in order to arrive at the destination, determined on the basis of the estimated fuel consumption for carrying out the mission, according to the established flight plan and an estimation of the average wind on the journey, and a safety reserve. However, the fuel consumption fluctuates during the mission, under the effect of various modifications which can be due to actions by the pilot, or to the external environment. In the first case, it is principally a matter of the following modifications: change of cruising altitude, modification of the cruising speed, or modification of the flight plan. In the second case, the external parameters are principally: modification of the speed and force of the wind at the flight altitude of the aircraft, modification of the external temperature, performance of the engines, failure of an engine. Depending on the modifications of the flight conditions during the mission, the consumption can increase in such proportions that the quantity could become insufficient: the estimated quantity of fuel remaining at destination then assumes a negative value. Emergency measures must then be taken by the pilot.

This makes it necessary to have a procedure for monitoring consumption fluctuations and for providing an alarm in the event of a consumption that is too great. According to the prior art, provision is thus made for the flight computer to estimate, throughout the mission, the quantity of fuel remaining at the destination on the basis of the fuel quantity, information on the real consumption of the engines provided by sensors, and estimations of the future consumption up to the destination.

More precisely, at a referenced waypoint of the flight plan, the various flight parameters taken into account in order to estimate the quantity of fuel remaining at destination depend on the future flight profile, in particular for the cruising altitude and speed, on the average wind estimated over the journey at the cruising altitude of the aircraft and on the external temperature. It also depends on the performance of the engines, and on a possible engine failure. In the case in which the estimated quantity of fuel remaining at destination becomes negative, a warning message is sent to the pilot. The latter must then consider a modification of the flight profile or a refueling stop with a diversion to a closer airport.

With regard to the flight profile, the pilot can for example reduce the cruising speed or modify the altitude. He then needs to be able to measure the effect of these measures on the consumption in order to determine if the measures taken will be sufficient to return to a positive value of the quantity of fuel remaining at destination.

Moreover, the pilot can be led to change his flight plan during the mission, for example in order to avoid a disturbed meteorological zone. In this case also, he therefore needs to check the effect of the modification on the consumption. The fluctuation of certain external parameters can also result in him wishing to check the fluctuation of the consumption. For the pilot, it is a matter of ensuring that the changing quantity of fuel remaining on board during the flight will allow him to reach his final destination in total safety.

DISCUSSION OF THE BACKGROUND

According to the prior art, the pilot carries out this check using the data of the page of the flight plan provided by the input and display or Multipurpose Control and Display Unit (MCDU) provided in the instrument panel, that is to say in the head down position of the cockpit.

In a known way an MCDU unit is one of the two interfaces provided to allow the pilot to have dialogue with the FMS (Flight Management System), which is an on-board computer. The other interface is an ND (Navigation Display) display screen upon which the flight path followed by the aircraft is shown, according to a chosen navigation mode (ARC or ILS for example). Whatever the type of representation of the flight path may be, the waypoints referenced in the flight plan which remain to be passed over appear on it. This screen is placed in the average head position.

The MCDU input and display unit comprises a keyboard and a screen and is placed in the head down position. It allows a dialogue between the flight management system and the pilot. This console, placed in the head down position, in particular allows him to enter the waypoints defining the flight plan and possibly to modify this flight plan.

The page of the flight plan is called up by the pilot using the keys of the keyboard (or of the screen) of the MCDU unit. This page is displayed on the screen. It normally displays, for all of the referenced waypoints of the active flight plan, various associated flight parameters, provided or calculated by the FMS (Flight Management System) on-board computer. These flight parameters are generally presented in line over two pages, considering the size of the screens. Depending on the number of referenced waypoints of the flight plan, the pages are also scrolled horizontally in order to display the various reference points. As shown in FIG. 1, the pilot can thus read, for each referenced point, the time of passing UTC over the point, and the cruising speed SPD and altitude ALT at that point, real for the points already passed, or estimated for the points to come, the heading TRK and the distance to travel between a referenced point and the following point, on a first page p1. By calling up a complementary page p2 on the display screen by means of control buttons provided for this purpose, he can read other data such as, for example, the speed and direction of the wind (not shown). He can in particular read the EFOB (Estimated Fuel On Board) data estimating the quantity of fuel remaining on board. At destination, that is to say the point referenced LMG in the example, the EFOB data is equal to the quantity of fuel remaining at destination, generally called EXTRA. The fuel quantity and more particularly the portion constituting the fuel reserve for the mission is calculated so that, according to the predicted average flight conditions for the journey, this EXTRA data is positive.

The calculation of the EFOB estimation and fluctuation data at each referenced waypoint of the flight plan is carried out by the on-board computer, the FMS, and is displayed for each referenced waypoint on the page of the flight plan. This calculation is based on the real consumption data available and on predictions according to the foreseen flight conditions over the journey. The EFOB data allows the pilot to monitor the fluctuations of the consumption during the mission. The pilot can derive from the EFOB data the quantity of fuel remaining at destination on the basis of the fuel quantity at each of the referenced points. However, in order to determine the quantity remaining on board at a given time in the mission, he must again extrapolate the values between the preceding passed referenced point and the next referenced point to be passed over. If these two points are very distant from each other, the result is very inaccurate.

The consumption monitoring procedure carried out by the pilot thus proves to be very fastidious and results in the pilot holding his attention, in the head down position, on the screen of the MCDU input and display unit, that is to say in him diverting his attention from the head up field of view in order to read the data and to make interpolation calculations. It has also been observed that the calculations that the pilot has to make can be inaccurate. Another complexity factor of this monitoring procedure is brought about by the modifications of the parameters of the flight plan, in particular if they are complex and at very short intervals, which obliges the pilot to recheck the consumption often, increases his task and multiplies the up and down movements between the head up and head down fields of view.

SUMMARY OF THE INVENTION

A subject of the invention is a flight management system which integrates functions of calculation and display of the state of the fuel reserves that are able to simplify the pilot's task and, in particular, to reduce the number of operations in the head down position.

A subject of the invention is a flight management system which integrates functions of calculation and display of the state of the fuel reserves which warns the pilot of a negative extra situation and facilitates the evaluation by the pilot of the effect of his piloting actions, or of modifications of external conditions, on the evaluation of his consumption.

The idea upon which the invention is based is the insertion of a point in the flight plan which marks the estimated passage through a certain quantity of remaining fuel. A consumption marker is obtained in this way and appears as a waypoint inserted in the flight plan. The insertion of this pseudo-waypoint in the flight plan results in its display in the flight plan page on the screen of the MCDU unit and on the flight path displayed on the navigation screen ND. Henceforth, its display draws the attention of the pilot. Moreover, the pilot no longer has to calculate since it is now referenced in the flight plan like a waypoint, and therefore with the associated data: UHT, SPD, ALT, etc. Finally, the actions undertaken by the pilot to correct the consumption are directly indicated by the display modifications which they generate: if the marker moves over the flight path towards the destination until it disappears or, on the contrary, towards the departure point, this means that these actions improve or, on the contrary, worsen the consumption.

The invention therefore relates to a flight management system for an aircraft, for executing a flight plan comprising referenced waypoints comprising a start point, an end point and intermediate waypoints, the said aircraft having a specified fuel quantity at the start of the said flight plan. It executes a function of monitoring the fuel consumption with respect to at least one threshold value, comprising an operation for estimating if the quantity of fuel remaining on board drops below a threshold at any point in the flight plan included between the start point and the end point, and for inserting a corresponding pseudo-waypoint in the flight plan, corresponding to the point where the said threshold is passed.

The calculated pseudo-point is displayed, with the referenced waypoints, on flight plan display screens.

According to one aspect of the invention, a pseudo-point can be generated automatically, for a threshold value calculated automatically by the on-board computer, or, following a manual activation of the monitoring function, for a manually entered threshold value.

The monitoring function is such that it displays the change in the position of a pseudo-point in real time according to fluctuations of the consumption.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DETAILED DESCRIPTION OF THE INVENTION

Figure 1:
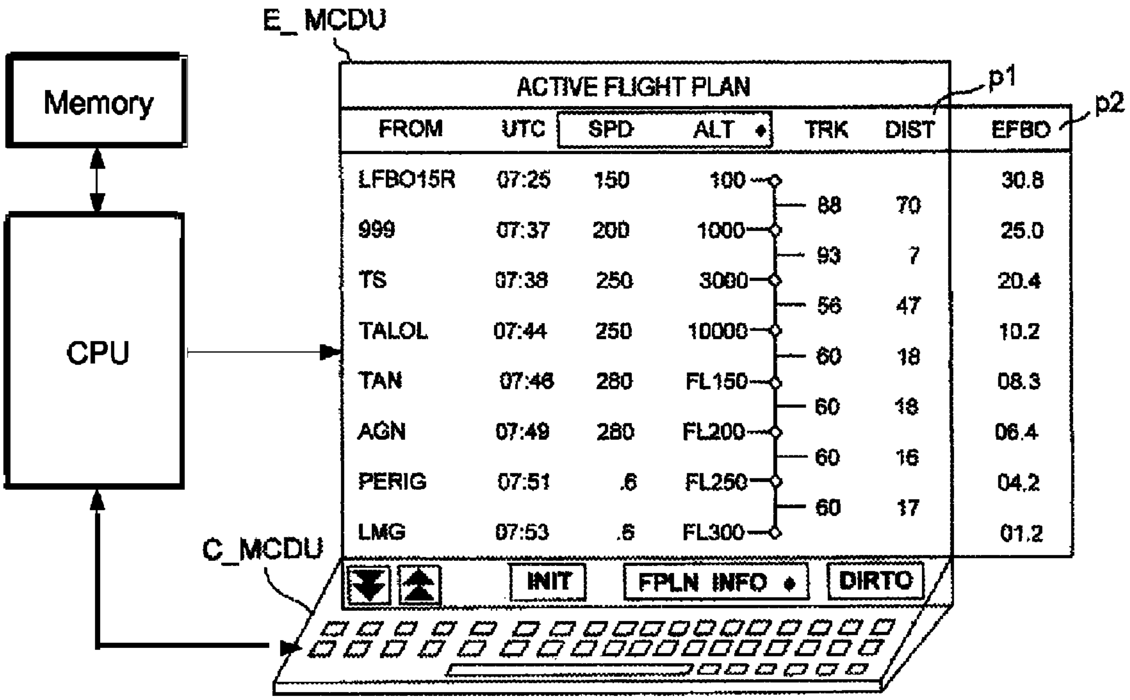
FIG. 1 shows a page of a conventional flight plan.

FIG. 1 depicts computer comprising a central processing unit (CPU) and memory interconnected to a display screen and keyboard entry device of a multi-purpose control and display unit (MCDU) of an aircraft, wherein the memory comprises software that when executed by the CPU is operable to receive input and generate output to the MCDU input and control unit. More specifically, FIG. 1 shows a page of a portion of an active flight plan, such as it conventionally appears to the pilot of an aircraft on the E-MCDU screen of the MCDU input and control unit of an aircraft. On it there can be read, for each of the referenced waypoints LFB015R, 999, TS, TALOL, TAN, AGN, PERIG and LMG, corresponding data and in particular the time of passing UTC over these points, the corresponding cruising speed SPD and altitude ALT, the mean heading TRK of the aircraft between two referenced waypoints and the distance DIST separating them, and an estimation at each point of the quantity of fuel remaining on board EFOB. The figures are given purely by way of example, in order to illustrate the description. The units for each of the items of data are the units normally used in this matter. With regard to the EFOB data, the unit is usually the tonne. The indication 30.8 for the start point LFBR thus signifies 30.8 tonnes.

In the example, at the time of display of this page shown in FIG. 1, the estimated quantity of fuel remaining on board at the destination point referenced LMG is −01.2 tonnes. In other words, in this example, EXTRA is negative.

Figure 2:
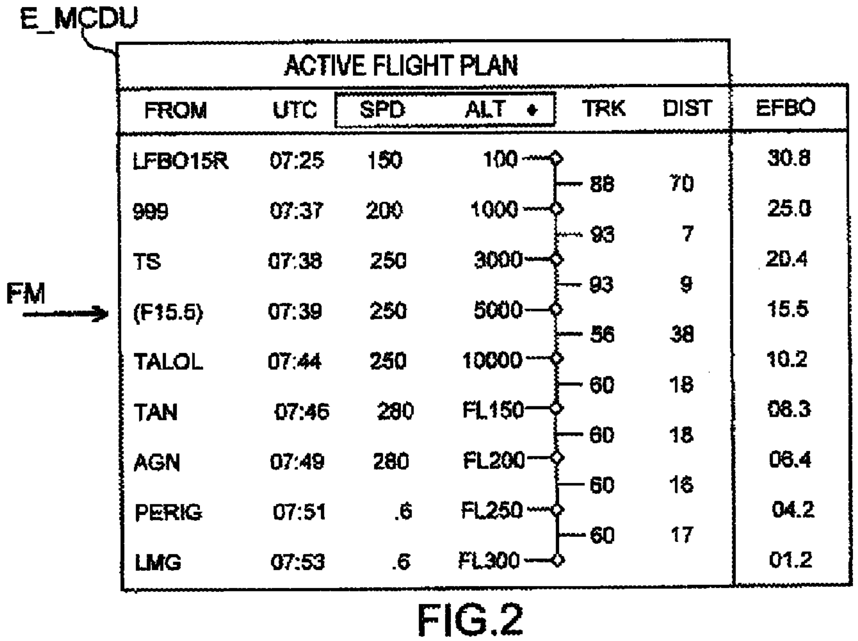
FIG. 2 shows this page of a flight plan comprising a pseudo-waypoint inserted in the flight plan, according to the invention.

According to the invention, and as shown in FIG. 2, a pseudo-waypoint is inserted in the flight plan after the pilot has entered a remaining quantity of fuel which he will have chosen as reference, in the example shown as F15.5, that is to say in a form FXY.Z, or XY.Z. It is typically expressed in tonnes. Thus, in the example, the predetermined quantity of fuel is 15.5 tonnes. The term pseudo-point is used because this consumption information is displayed like a waypoint on the flight plan. This pseudo-point is linked with the flight plan and can be displayed on it: the calculations are carried out along the curved flight path of the flight plan of the aircraft, for the mission in progress, that is to say not on the basis of a direct "as the crow flies" path, which would generate erroneous predictions, but on the basis of the real flight path.

The display of this value Qr in the flight plan informs the pilot that at this precise point in the flight there remain no more than Qr tonnes of fuel in order to take the flight to its destination. This display represents an indication for the pilot who will have to use it in order to adapt or not to adapt the parameters of his flight. The position of the pseudo-waypoint F15.5 is calculated by prediction by the flight management system, the FMS, according to the consumption of fuel on the basis of the flight plan, of data from on-board sensors and of the value of the threshold.

This position is recalculated each time that a flight parameter affecting the consumption changes. The display of the pseudo-point thus makes it possible to monitor the change in its position in real time, revealing the real time fluctuations of the consumption.

The insertion of this pseudo-waypoint in the flight plan results in its display on the display screens of the flight plan, typically on the two screens of the on-board computer/pilot interface: the E-MCDU screen, as seen in connection with FIG. 2 and the navigation screen ND.

Figure 3:
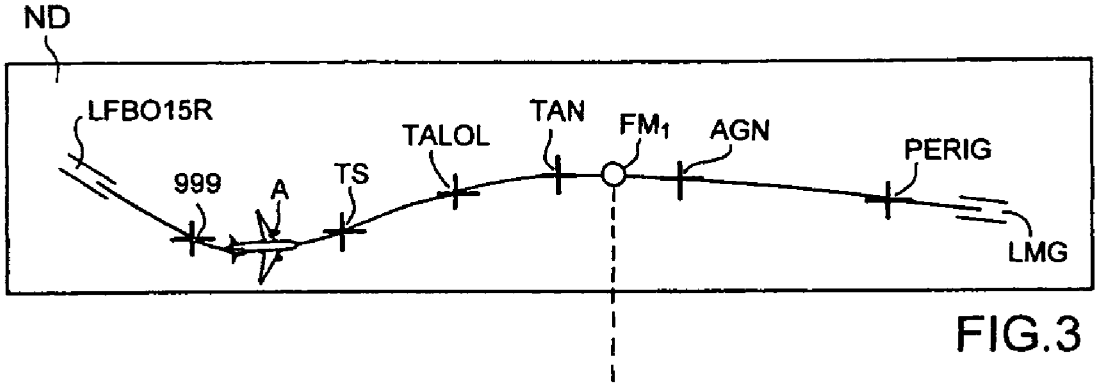
FIGS. 3 to 5 show examples of the display of a corresponding marker on the navigation screen.

In FIG. 3 a graphical representation of the navigation screen ND of the active established flight plan corresponding to the flight plan page shown in FIG. 2 has been shown diagrammatically. In the example, this representation appears in the form of a jagged line passing through the various referenced waypoints of the flight plan. In practice, the graphical representation modes are generally different, but all of them indicate the referenced waypoints of the flight plan in one form or another. In the example, the position of the aircraft A is shown, with the referenced waypoints of the flight plan, that is to say in this example LFBRO15, 999, . . . . PERIG, LMG.

In the invention, the insertion of a pseudo-waypoint in the flight plan results in the display on the navigation screen ND of a marker corresponding to the location corresponding to the position $FM_1$ of this pseudo-point on the plot of the flight path of the aircraft. Preferably, a marking unique to the pseudo-point and different from the markers used for the referenced waypoints is used. It can therefore be noticed by the pilot. On the screen of the MCDU unit it is the form FXY.Z that distinguishes this pseudo-point from the referenced waypoints. On the navigation screen ND symbols are used: a circle in the illustrated example, whilst the referenced waypoints are represented by crosses. This is given only by way of illustration.

In practice, the consumption monitoring function used according to the invention in the flight management system comprises, for a given threshold value QR, the execution of a first operation of estimating the position of the said pseudo-waypoint, giving a position of the corresponding pseudo-point.

It comprises a repetition of this operation of estimation and display of the position of the pseudo-point, making it possible to monitor the change in the consumption, according to the modifications of the flight parameters affecting the consumption. After the first estimation operation, the other operations are initiated by the modification of one of these parameters, making it possible to monitor the change in its position in real time, revealing the real time fluctuations of the consumption.

Figure 4:
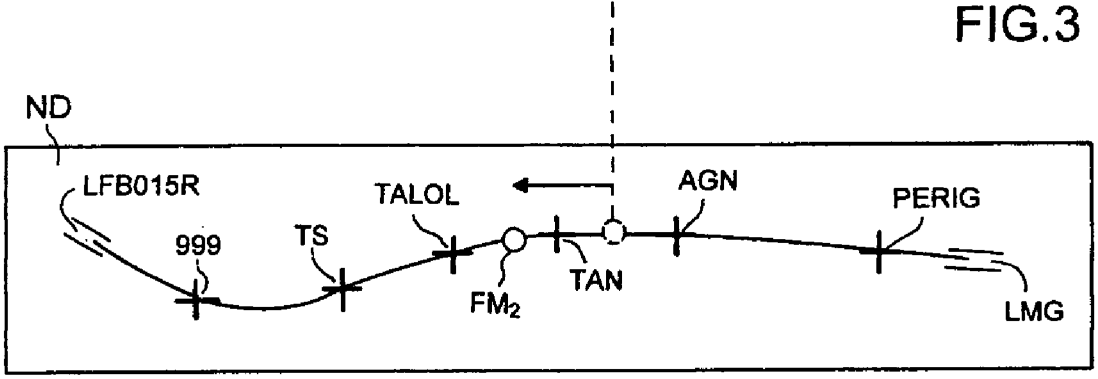

FIG. 4 shows, on the navigation screen ND, the new recalculated position $FM_2$ of the pseudo-point F15.5, following a modification of one or more flight parameters affecting the consumption. The pilot can thus directly see the effect of his actions, or of modifications of the environment of the aircraft, on the consumption.

Figure 5:
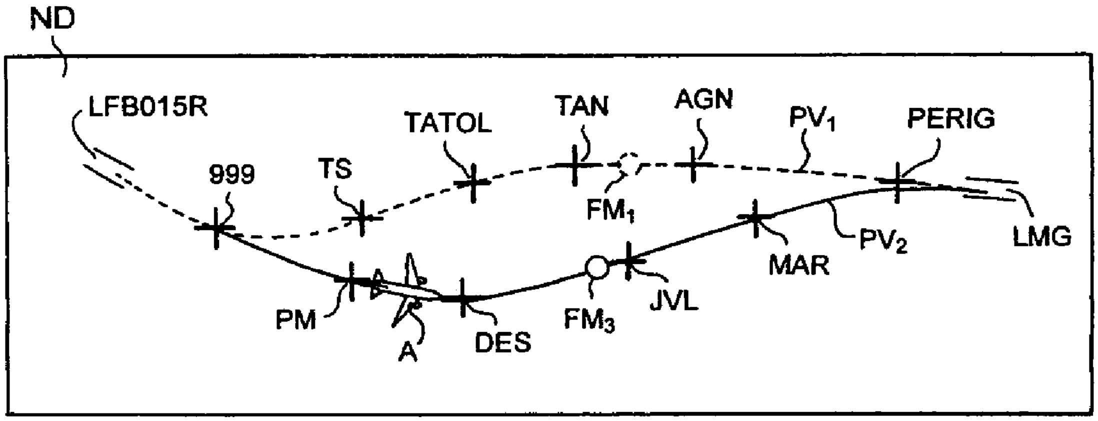

In FIG. 5, the case is shown in which the pilot modifies his flight plan, changing from an initial flight plan $PV_1$ to another flight plan $PV_2$. The change of profile results in the recalculation of the estimated position of corresponding pseudo-point, which gives the position $FM_3$ shown in the figure.

According to one aspect of the invention, the monitoring function comprises an automatic activation mode. In this mode, the initialization of the said threshold value QR is carried out by the on-board computer according to the parameters of the flight plan and the initial fuel quantity, and typically corresponds to the reserve for that flight. The display of a corresponding pseudo-point in the flight plan therefore signifies that the EXTRA, that is to say the quantity of fuel remaining on board at destination LMG, is negative or zero. The displayed pseudo-point therefore shows the pilot the position of the aircraft at which he will start using the reserve. In this case of an automatic monitoring function, the invention which has just been described makes it possible to warn the pilot that, as from the pseudo-point whose position $FM_i$ is displayed on the flight path, on the navigation screen, he will begin to use this fuel reserve to the detriment of safety conditions for the end of the flight. This displayed information constitutes an aid in the decision to divert to a closer airport in optimal conditions. The computer can pair the display of the pseudo-point with at least one proposal to divert to a closer airport.

According to another aspect of the invention, the monitoring function comprises a manual activation mode. The function is initiated by the manual input of a threshold value QR. In practice, the pilot enters this value manually using the keyboard C-MCDU of the input unit MCDU. The display of a pseudo-point associated with a threshold value QR, entered by the pilot, meets his own requirements to monitor the consumption of fuel. The entered value therefore corresponds to an available quantity of fuel, which serves as a marker. In this case it is a matter of the pilot entering a pseudo-point for which he can display directly the fluctuation of the consumption. In practice, he must enter a value for which the position of the calculated pseudo-point will be between the start point and the end point in order to have a corresponding display.

In the case of the automatic monitoring function, the pseudo-point is displayed only if the problem of a zero or negative EXTRA arises. If there is no problem, the pseudo-point will not be displayed because, for the corresponding threshold value, the calculations will not result in a position between the start point and the end point of the flight plan.

The flight management system can therefore be made to manage several threshold values.

In all cases, the monitoring function according to the invention allows the pilot to closely monitor the change in fuel consumption, with direct access to this important flight management data in his average head position field of view, displayed as a waypoint on the flight plan, and allows the possibility of the pilot entering a threshold value chosen on the basis of criteria other than that of the state of the reserve.

The calculation and display of this pseudo-point according to the invention associated with weather predictions can reveal a change in consumption. Typically, if the pseudo-point is not stable but moves over the curved path of the flight plan, this signifies that the predictions and reality are diverging and can reveal an operational problem of the aircraft (fuel leakage, undercarriages not retracted resulting in excess consumption, etc.).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A flight management system (FMS), comprising:

a computer electrically connected to a Multipurpose Control and Display Unit (MCDU) that includes a display screen and an input keyboard;

wherein the computer includes a memory device that includes a stored flight plan having referenced waypoints, including a start point, an end point and intermediate waypoints, each waypoint having a display marker;

wherein the stored flight plan further comprises a predetermined threshold fuel quantity, and a pseudo-waypoint, corresponding to a point where the predetermined threshold is passed;

wherein the computer is configured to execute a fuel consumption monitoring function stored in the memory, the monitory function based upon said referenced waypoints, said pseudo-waypoint, and a specified fuel quantity at the start of the flight plan, the monitoring function comprising:

a threshold-passing estimation function for estimating if a quantity of fuel remaining on board drops below the predetermined threshold value at any point in the flight plan between the start point and the end point, and an inserting unit function for inserting the pseudo-waypoint in the flight plan, corresponding to the point where the threshold is passed.

2. The system according to claim 1, wherein the monitoring function includes an operation of displaying the said pseudo-waypoint on the flight path of the flight plan, with referenced waypoints, on the display screen.

3. The system according to claim 2, wherein the FMS includes a marker corresponding to the pseudo-waypoint that is distinctive in comparison with the markers of the referenced waypoints.

4. The flight management system according to claim 1, wherein the monitoring function has a mode of automatic activation, for a threshold value calculated by the computer according to the parameters of the flight plan and the fuel quantity.

5. The flight management system according to claim 4, wherein the threshold value calculated by the computer is equal to a reserve value for the flight plan, the display of a corresponding pseudo-point on the display screen displaying the flight plan indicating that as from the corresponding position, the aircraft is using the reserve.

6. The flight management system according to claim 4, wherein the display of the pseudo-waypoint associated with the threshold value calculated by the computer is paired with at least one proposal to divert to a closer airport.

7. The flight management system according to claim 1, wherein the monitoring function comprises a mode with manual activation by a manual input of a threshold value.

8. The flight management system according to claim 7, wherein the manually entered threshold has a value determined in order to allow a monitoring of consumption fluctuation.

9. The flight management system according to claim 1, wherein the activation of the monitoring function with respect to a given threshold value comprises the execution of a first operation of estimation and of display of the position of a corresponding pseudo-waypoint, giving a first position, and one or more following estimation and display operations, in order to monitor the change in the position of the pseudo-point.

10. The flight management system according to claim 9, wherein the following estimation and display operations are each initiated by the modification of a flight parameter affecting the consumption.

11. The flight management system according to claim 2, wherein monitoring function has a mode of automatic activation by the computer, for a threshold value calculated by the computer according to the parameters of the flight plan and the fuel quantity.

12. The flight management system according to claim 3, wherein monitoring function has a mode of automatic activation by the computer, for a threshold value calculated by the computer according to the parameters of the flight plan and the fuel quantity.

13. The flight management system according to claim 5, wherein the display of the pseudo-waypoint associated with the threshold value calculated by the computer is paired with at least one proposal to divert to a closer airport.

14. The flight management system according to claim 2, wherein the monitoring function comprises a mode with manual activation by a manual input of a threshold value on the keyboard.

15. The flight management system according to claim 3, wherein the monitoring function comprises a mode with manual activation by a manual input of a threshold value on the keyboard.

16. The flight management system according to claim 4, wherein the monitoring function comprises a mode with manual activation by a manual input of a threshold value on the keyboard.

17. The flight management system according to claim 5, wherein the monitoring function comprises a mode with manual activation by a manual input of a threshold value on the keyboard.

18. The flight management system according to claim 6, wherein the monitoring function comprises a mode with manual activation by a manual input of a threshold value on the keyboard.

* * * * *